United States Patent

[11] 3,596,442

| [72] | Inventor | Gerhard Max Neumann<br>Berlin-Dahlem, Germany |
|---|---|---|
| [21] | Appl. No. | 835,543 |
| [22] | Filed | June 23, 1969 |
| [45] | Patented | Aug. 3, 1971 |
| [73] | Assignee | Delbag-Luftfilter G.m.b.H.<br>Berlin, Germany |
| [32] | Priority | June 22, 1968 |
| [33] | | Germany |
| [31] | | P 17 57 865.3 |

[54] DRUM FILTER
22 Claims, 21 Drawing Figs.

[52] U.S. Cl. ............................................. 55/354,
55/429, 55/471
[51] Int. Cl. ................................................ B01d 46/20
[50] Field of Search............................................ 210/400–
—404; 55/351—354, 400, 429, 471; 242/55

[56] References Cited
UNITED STATES PATENTS

| 1,783,181 | 12/1930 | Birkholz | 55/354 |
| 1,933,635 | 11/1933 | Meyer | 55/354 |
| 2,119,978 | 6/1938 | Wolthius et al. | 55/354 |
| 2,463,723 | 3/1949 | Spraragen | 55/354 |
| 3,296,780 | 1/1967 | Revell | 55/354 |
| 3,242,653 | 3/1966 | Sylvan | 55/354 |
| 3,472,002 | 10/1969 | Brown et al. | 55/302 |
| 3,483,675 | 12/1969 | King, Jr. | 55/302 |

FOREIGN PATENTS

| 746,162 | 3/1956 | Great Britain | 55/354 |

*Primary Examiner*—Frank W. Lutter
*Assistant Examiner*—Bernard Nozick
*Attorney*—Cushman, Darby & Cushman ABSTRACT: A drum filter for filtering a stream of gas, comprising a boxlike casing which can be connected in horizontal and/or vertical juxtaposition with other like casings, a drum having a gas-permeable circumferential surface adapted to be enveloped at least partially by a travelling filter cloth drawn from an idler spool and wound on a driven spool, the spools each being mounted in a spool chamber and being rotatable about axes parallel to the axis of the drum, the spool chambers each having at least one hinged access door disposed in a plane parallel to the axis of the drum, a gas entry in one side of the casing and a gas exit in another side of the casing, the location of the entry and exit being chosen according to the desired direction of flow of the gas stream through the casing and filter and the construction being such that the gas stream can enter the casing either radially or axially of the drum dependent upon the location of said entry.

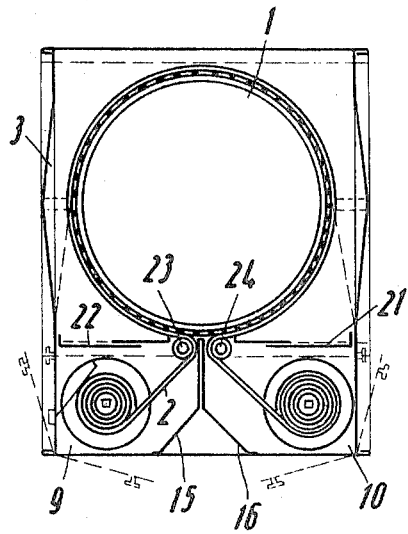
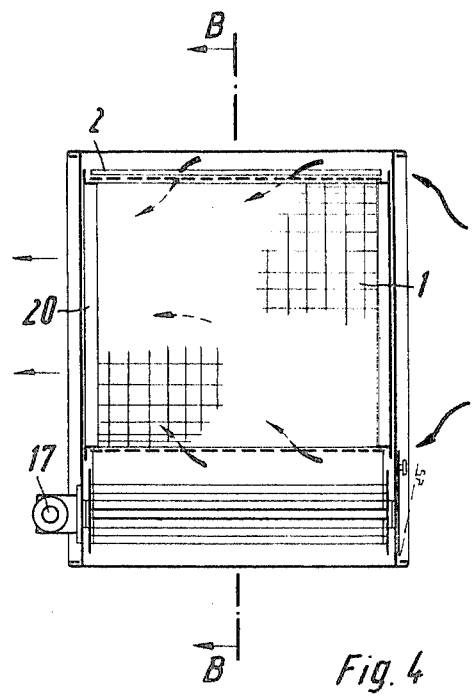
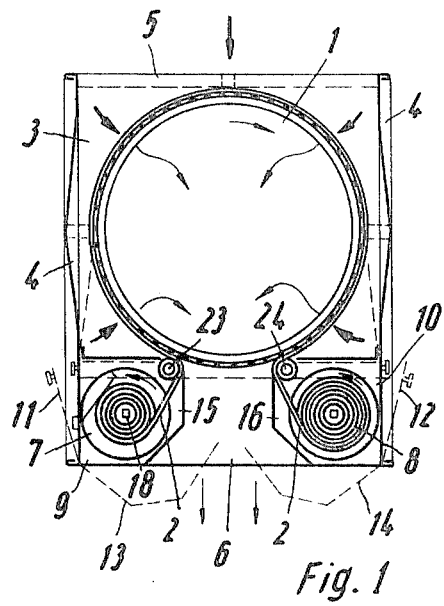
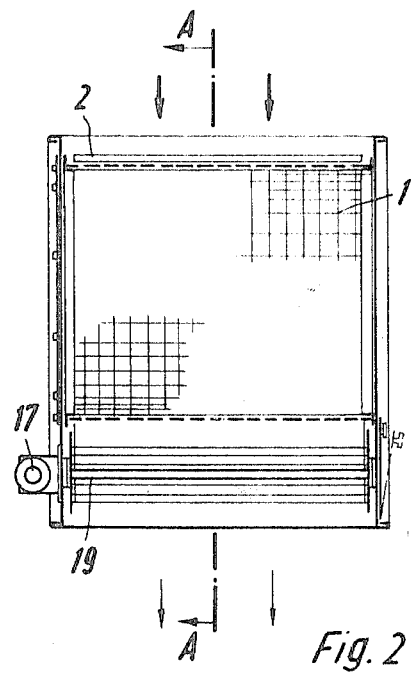
Fig. 3
Fig. 4
Fig. 1
Fig. 2
Inventor:
Gerhard Max Neumann
By Cushman, Darby & Cushman
Attorneys Inventor:
Gerhard Max Neumann
By Cushman, Darby & Cushman
Attorneys

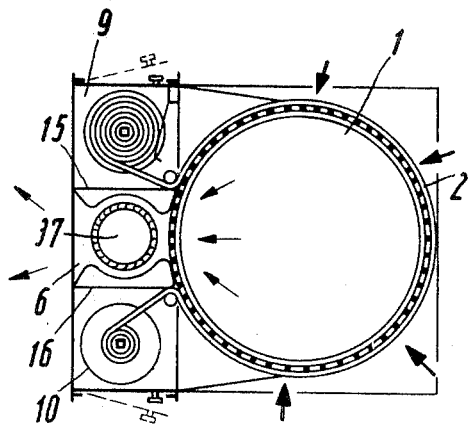
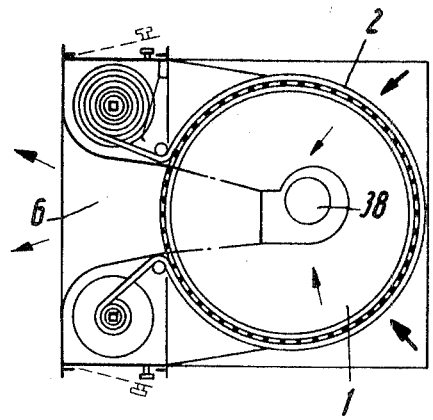
Fig. 18
Fig. 20
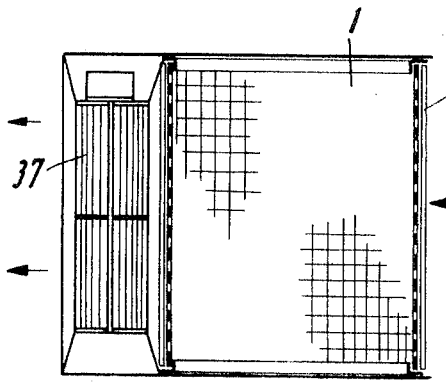
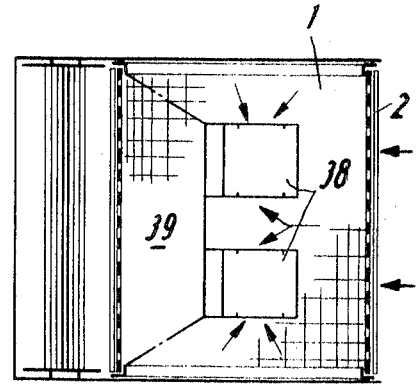
Fig. 19
Fig. 21

DRUM FILTER

The present invention relates to drum filters of the kind used for separating solid particles from a stream of gas or air. Wherever hereinafter reference is made in the specification or claims to a gas or gas stream, this is intended also to include air or a stream or air.

It is already known to provide drum filters having a cylindrical drum the screenlike shell of which carries a filter cloth through which the gas passes and which envelops at least part of the circumferential surface of the drum. The filter cloth is drawn from a supply spool and is rewound on a takeup spool. The body of the drum may be stationary or it may be rotatable about its axis.

These know filters take up a considerable amount of space and any particular size can be installed in only one particular way. Moreover it is not possible to combine a plurality of such filter units to form a major assembly without at the same time considerably reducing the effective cross section of flow.

It is the object of the present invention to alleviate these shortcomings of conventional drum filters and to provide a drum filter having a rotating drum capable of very compact construction which does not unduly constrict the cross section of say a duct in which the filter is installed. The envisaged filter was required to be of simple design and to be capable of being combined with other similar drum filters to form major unit assemblies. Above all, the contemplated filter was intended to be so designed that it could readily be manufactured for different ways of installation and could be constructed in different sizes without impairment of the previously enumerated advantages.

Accordingly the present invention provides a drum filter for the filtration of a stream of gas, comprising a rectangular casing adapted for connection in horizontal and/or vertical juxtaposition with other like casings, a drum in said casing, said drum having at least one closed end and having a gas-permeable circumferential surface adapted to be enveloped at least partially by a travelling filter cloth drawn from a idler spool and wound on a driven spool, said spools being rotatable about axis parallel to the axis of the drum, a first spool chamber for one of said spools and a second spool chamber for the other of said spools, the said chambers each having at least one hinged access door disposed in a plane parallel to the axis of the drum, an entry in one side of the casing and an exit in another side of the casing for the gas stream, the location of the entry and exit being chosen according to the desired direction of flow of the gas stream through the casing and filter and the construction being such that the gas stream can enter the casing either radially or axially of the drum dependent upon the location of said entry.

The said spool chambers may each have a filter cloth deflecting roller adjustable to maintain a filter cloth tightly against said drum and in sealing contact with a wall of its chamber.

A particularly useful arrangement is for said spool chambers to be spaced from one another at one side of the casing and for the sidewalls of the chambers to define said gas exit. Said chamber sidewalls forming the exit may be arcuate or otherwise formed to outward diverge at least at the downstream end thereof. The configuration of the resultant gas exit thus resembles that of a divergent duct.

In another arrangement the filter cloth deflecting rollers of said spool chambers are in close juxtaposition, said drum is closed at one end only, and the entry and exit are located to permit axial admission and discharge of the gas relative to the drum. The proposed features enable the contemplated objects to be achieved, the simple adaptability during manufacture of the drum filter to existing installation conditions being a feature deserving special mention.

The drum may be supported at its ends on inwardly directed annular flanges provided by special angle section rings attached to the casing, possibly in a manner creating a gastight joint, the drum either resting on said flanges or being rotatable thereon as by the interposition of balls or rollers between the drum and the flanges. Alternatively, the drum may be fitted with radial or diametrical stays and rotatably mounted on one or more axle pins carried by the casing.

The interior of the drum can be sealed against the passage of gas other than by way of the filter cloth in a simple way by making the diameter of the drum slightly less than that of an annular shoulder on the flange of each angle section ring so that a filter cloth can ride on these shoulders and automatically maintain a good seal.

By the provision of flange holes or angle section flanges on the casing edges, several drum filters can be bolted together in horizontal and/or vertical juxtaposition to form a larger assembly, e.g., to form a filter wall facing an opening in brickwork or a duct. As already mentioned, allowance can be readily made for differences in dimensions which frequently occur in actual practice. Preferably the driven filter cloth spool is provided with a square section shaft so that by simple push-in socket joints the shafts of two or more filters can be coupled. Only one driving motor will then be needed for said shafts and the space otherwise occupied by several motors can be saved.

Drum filters according to the invention can be produced according to different installational needs without requiring any modification of the underlying design principles, As a supplementary feature the filter may be fitted with louvres controlled by reference to the speed of the filter cloth. The spools for the filter cloths can be provided with detecting devices which indicate the length of filter cloth that has already been used. In order to prevent the takeup spool from being unduly laden with dust, scraper blades may be provided which scrape some of the dust off the filter cloth before it is rewound. The seal of the casing interior can be substantially improved by providing a drum fitted with a wire grid that has a closer mesh at the ends than in the middle of the drum. Without greatly reducing the open cross section of the drum surface this arrangement ensures that the filter cloth will not be pulled off the sealing annular shoulders hereinbefore described because in the regions of the drum ends the cloth will lie flat on the grid without being drawn by the suction into the mesh openings.

Preferred embodiments of the invention are illustratively shown in the drawings in which FIG. 1 is a cross section taken on the line A—A in FIG. 2;

FIG. 2 is a longitudinal center section of one form of construction;

FIG. 3 is a cross section taken on the line B—B in FIG. 4;

FIG. 4 is a longitudinal section of another form of construction;

Figure 12:
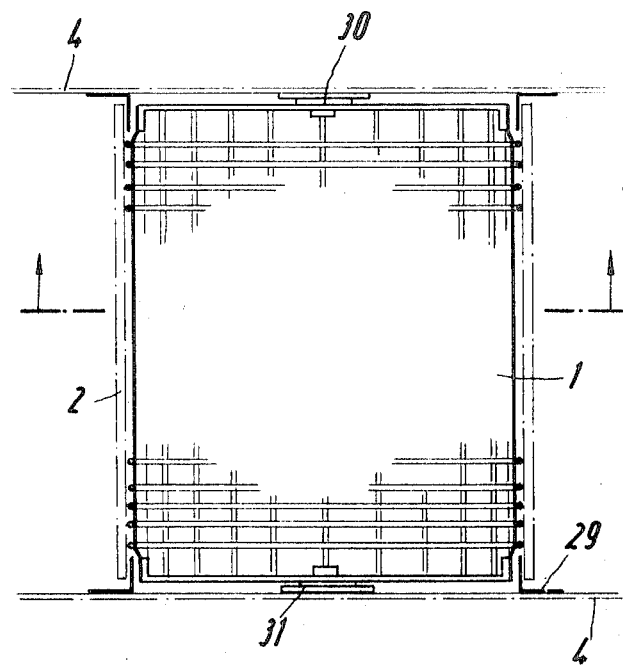

FIG. 12 a horizontal section of a special form of construction of the body of the drum.

Figure 13:
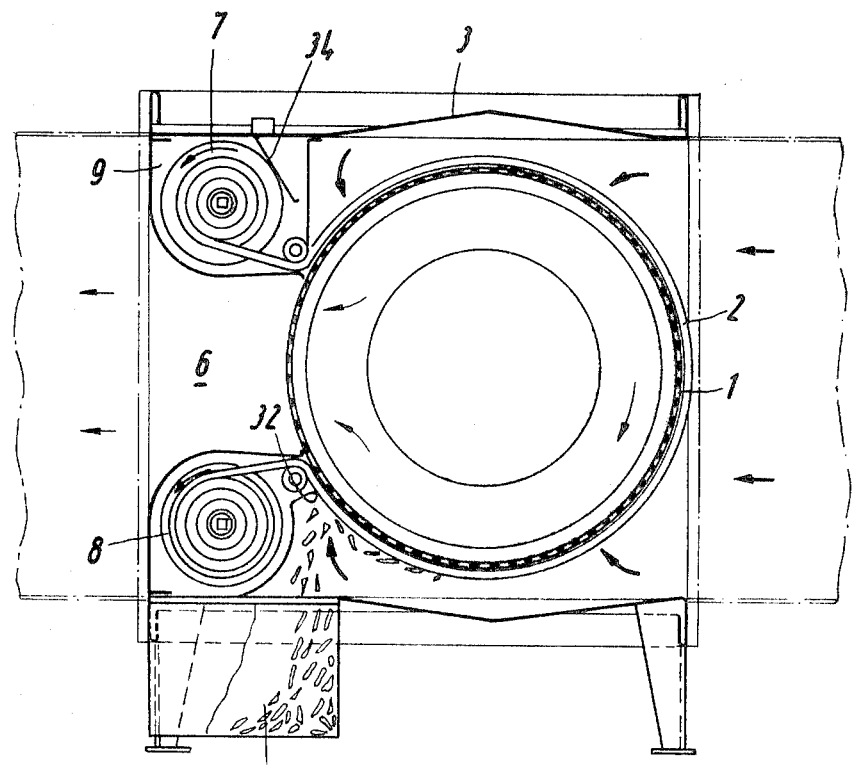
Figure 14:
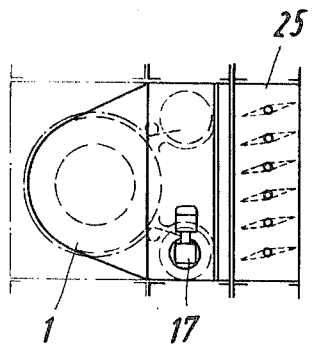
Figure 15:
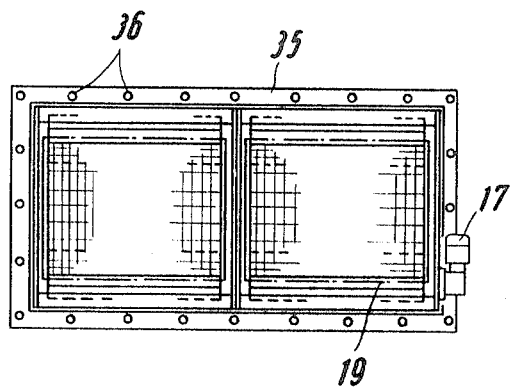
Figure 16:
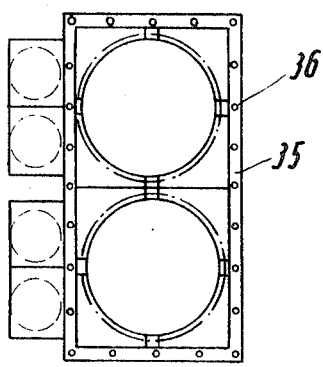
Figure 17:
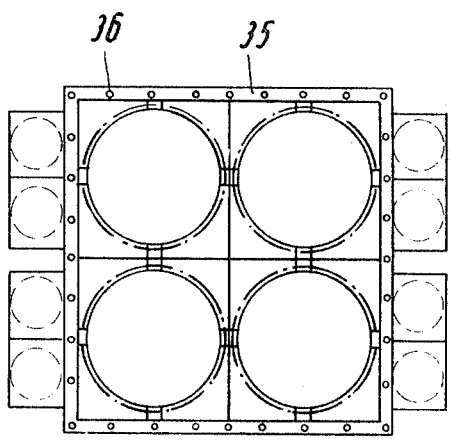

FIG. 13 is an embodiment comprising a scraper for removing dirt deposited on the filter cloth;

FIG. 14 is an embodiment comprising a throttling louvre;

FIGS. 15 to 17 illustrate different ways of connecting filters together;

FIGS. 18 and 19 are a vertical and horizontal section respectively of an embodiment comprising a fan, and FIGS. 20 and 21 are a vertical and horizontal section respectively of an alternative embodiment comprising fan means.

In the drawings like and functionally corresponding parts are identified by the same reference numbers.

In the embodiment according to FIGS. 1 and 2 there is provided a cylindrical drum 1 with closed ends and an air-permeable shell preferably in the form of a steel wire grid for supporting a filter cloth 2. The drum 1 is rotatable about its axis in a casing 3. The sheet metal casing 3 comprises four closed sidewalls 4 and two openings on opposite sides for the entry therethrough at 5 and the discharge at 6 of the gas into and from the casing.

The filter cloth is drawn from an idling spool 7 and, having performed its filtering function, it is rewound on a driven spool 8. These spools are contained in chambers 9 and 10 which, according to requirements, are provided with different hinged doors located at different levels, i.e., with doors 11/12 or 13/14. The sidewalls 15 and 16 of chambers 9 and 10 define a gas exit channel 6. Conveniently the sidewalls 15 and 16 may be appropriately shaped to impart a generally nozzle-shaped cross section to this channel 6.

The drive means for the spool 8 are shown at 17. The spools 7 and 8 are mounted on square section shafts 18 and 19 which permit a driving connection to be established with the corresponding spool of a neighboring drum filter through a push-in socket coupling when a plurality of filters are associated in assembly.

If the drum filter illustrated in FIGS. 1 and 2 is to be used in a different kind of installation, it may be constructed as shown in FIGS. 3 and 4 with a drum 1 open at one end 20 and a casing 3 which has an open end wall at the axially opposite end. The sidewalls 21 and 22 of the chambers 9 and 10 are extended in this construction so that the sidewalls 15 and 16 are in contact. In all the Figures of the drawings the path of the gas is indicated by arrows, the black arrows signifying the dust-laden gas and the white arrows the clean gas.

Adjustable deflecting rollers 23 and 24 for the filter cloth are mounted in the sidewalls 21 and 22 and serve to press the filter cloth 2 tightly against the circumference of the drum 1. They also make sealing contact with their respective chamber walls 21, 22. It will be understood that the deflecting rollers are adjustable within a wide range of different settings.

The filter cloth 2 is, when the filter is in use, slowly drawn around the circumference of the drum 1 which may be stationary but is preferably driven to rotate about its axis to reduce friction. Whilst the filter cloth 2 travels around the drum 1 it retains any solids suspended in the gas which flows in the direction of the arrows.

Figure 5:
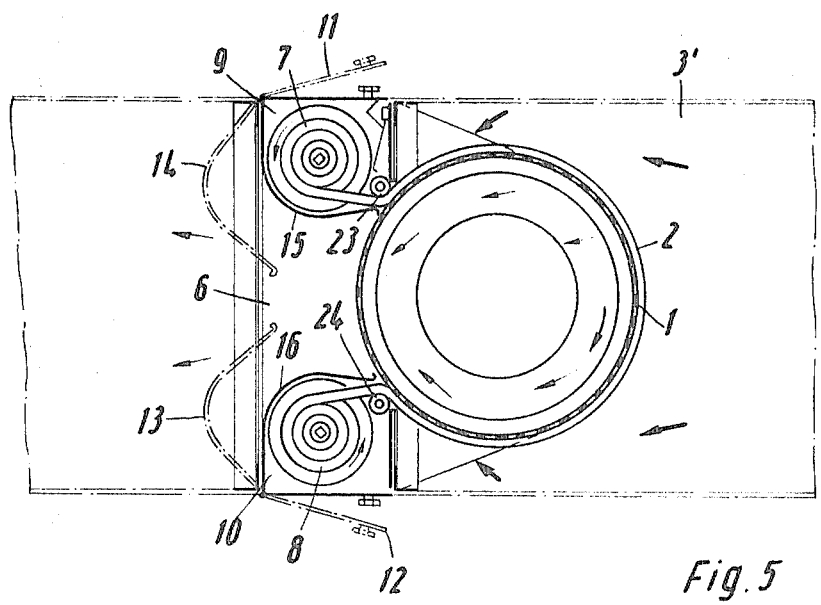
FIGS. 5 and 6 are a vertical and horizontal section respectively of another embodiment.
Figure 6:
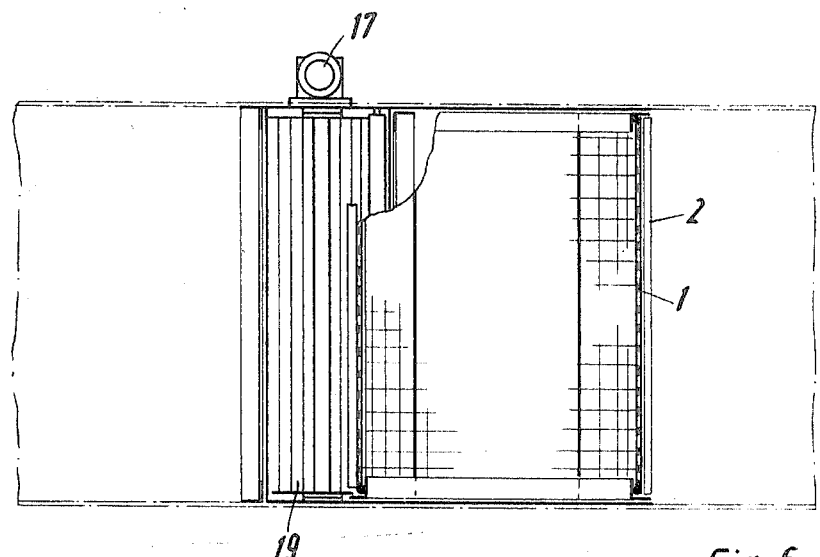
Figure 7:
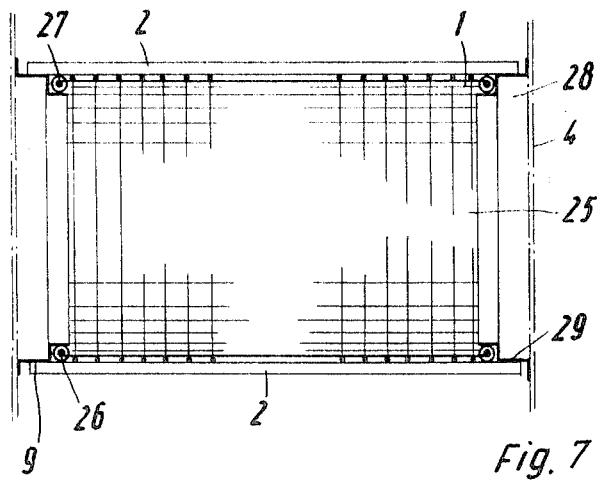
FIGS. 7 to 10 illustrate different methods of mounting the drum.

FIGS. 5 and 6 illustrate an arrangement which corresponds to that in FIGS. 1 and 2 except that the casing 3 forms a rectangular section duct 3' or part of such a duct. The sidewalls 15 and 16 of the chambers 9 and 10 are arched to form a gas exit channel 6 which very closely approaches a nozzle shape to create the best possible conditions of flow for the reduction of pressure loss in the filter.

Figure 8:
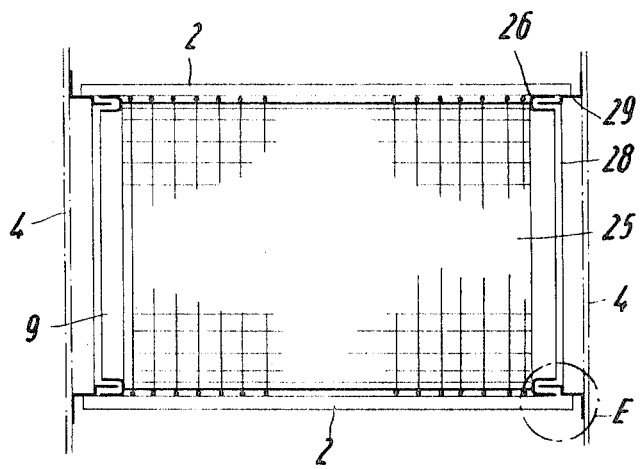
Figure 10:
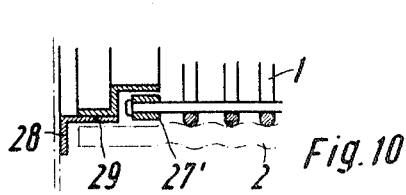
Figure 9:
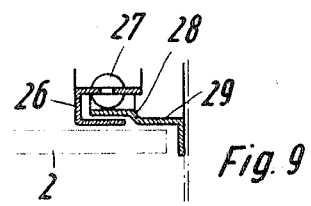

The manner in which the drum is mounted will be understood from FIGS. 7 to 10. The drum itself consists of a steel wire grid 25 extending between two end rings 26. These rings carry balls 27, which may be of plastics, and which run on offset flanges of angle section rings 28 and thereby provide a smooth antifriction bearing. Instead of balls 27 rollers could be provided. FIG. 8 illustrates a modified form of flanged angle section 28, which is even more clearly shown in FIG. 9 representing the portion E in FIG. 8 on a larger scale. The balls 27 are rotatably riveted to the end rings 26. FIG. 10 is an arrangement comprising a roller 27¹. The angle section rings 28 are affixed to the walls 4 of the casing, for instance by welding to form a gastight joint.

The angle sections 28 have a diameter slightly exceeding that of the drum 1. This permits a bearing shoulder 29 to be provided upon which the edge of the filter cloth 2 can ride to form a seal whilst the drum 1 rotates. In this connection it may be noted that conveniently the steel wire grid 25 may be provided with a closer mesh at the drum ends than in the center for the reasons that have already been explained.

In a simpler form of construction of the drum 1 the balls or rollers may be dispensed with and the drum directly mounted on the rings 28. In such a case the drum 1 would not be rotated and the filter cloth 2 would be drawn over the stationary circumference of the body of the drum 1.

Figure 11:
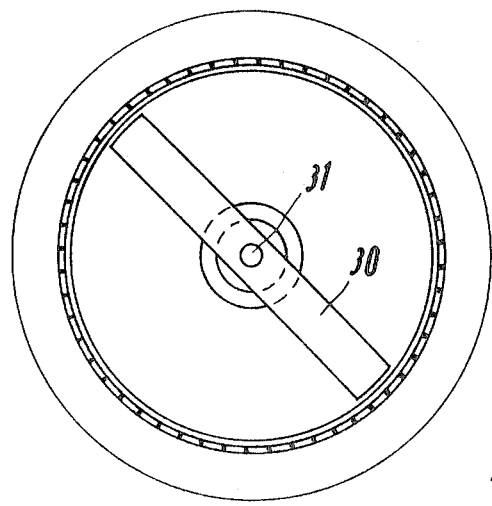
FIG. 11 is an end-on view.

Alternatively (as shown in FIGS. 11 and 12) the body of the drum 1 may be provided with diametrical stays 30 mounted on axle pins 31 (FIGS. 11 and 12) affixed to the casing walls 4. This arrangement, like the others, is also very compact, since no bearing brackets, mountings or the like are needed. Otherwise the embodiment in FIGS. 11 and 12 functions in the same way as the others.

In the further development of the proposed forms of construction additional devices may be provided. FIG. 13 shows the provision of a scraper blade 32 associated with a detachable collecting box 33. The scraper blade removes fibers and the like which may have adhered to the filter cloth and thus prevents them from being carried into the roll on the spool 8.

Moreover, inside the box 9 a feeler 34 may be provided to detect when the spool 7 is nearly empty and to stop the driving motor 17 when this is the case (cf. FIG. 1). Preferably the motor 17 may be controlled by a differential pressure contact manometer for controlling the speed of travel of the filter cloth 2 according to the pressure conditions existing inside a gas system in which the filter is installed. Furthermore, for the purpose of controlling these pressure conditions, it may be advantageous, as shown in FIG. 14, to provide a throttling louvre 25 on the entry side of the filter drum 1.

FIGS. 15, 16 and 17 illustrate the manner in which several drum filters may be combined to form major assemblies by joining them together by flanges 35 containing holes 36 and extending along the edges of the casings. The flanges 35 may be secured to the casings of the filter units or be formed integrally therewith. Several filters may thus be joined together horizontally and/or vertically. This permits filter walls to be erected, e.g., in front of openings in brickwork or ducts.

It should be added that it is quite feasible to conduct the gas in a direction opposite to that indicated in FIGS. 1 to 6 and 13. Occasionally this may be useful.

A drum filter according to the invention will be preferably aerodynamically so designed that pressure losses in the filter are minimized. Such filters can therefore also be used where the available pressure gradients of the filtered gas is low. Nevertheless, it may be desirable to work at higher pressures. This can be done because the design of filter according to the invention permits a fan or fans to be additionally incorporated without requiring the external shape of the casing to be modified. As will be understood from FIGS. 18 and 19 a so-called crossflow (tangential) fan 37 may be provided to fill the exit channel between the sidewalls 15/16 of the chambers 9 and 10. The cylindrical rotor of this fan will then draw the gas from the interior of the drum 1 and blow it to the outside. Alternatively, if the drum 1 is stationary, one or more fans 38 may be located inside the drum to exhaust the gas through a convergent duct 39 into the channel 6 (FIGS. 20 and 21). These embodiments with auxiliary fans improve the application flexibility of the drum filter, for instance for air conditioning installations in which such a filter can be readily incorporated.

I claim:

1. Apparatus for supporting a filter band for the filtration of a stream of gas, comprising
   a. a rectangular section boxlike casing adapted for connection in horizontal or vertical juxtaposition with other like casings;
   b. a drum in said casing, said drum having at least one closed end and having a gas-permeable peripheral wall enveloped at least partially by a filter band;
   c. means for supporting for rotation about an axis parallel to the axis of the drum a spool of fresh filter band;
   d. means for supporting for rotation about an axis parallel to the axis of the drum a takeup spool for the used filter band;
   e. means for driving said takeup spool;
   f. a first spool chamber defined by sidewalls containing one of said spools and a second chamber defined by sidewalls containing the other of said spools;

g. said chambers are disposed at one side of said drum and each include sidewalls carrying a filter-band deflecting roller;

h. said chambers have openings for the filter cloth and said deflecting rollers are mounted in said openings so that the flow of gas to be filtered is substantially excluded from said chambers;

i. said chambers each have at least one access door hinged about an axis parallel to the axis of the drum;

j. the casing has an entry side and an exit opposite side for the gas stream;

k. the entry and exit sides are opposite one another and means for passing gas from the entry side to the exit side through the filter band and drum.

2. A drum filter according to claim 1, wherein said spool chambers are spaced from one another at one side of said casing and said exit is defined therebetween.

3. A drum filter according to claim 2, wherein the walls of said spool chambers defining said exit diverge at least in part towards the downstream end of said exit.

4. A drum filter according to claim 2, wherein said entry is in that side of the casing opposite said exit and said drum is closed at both ends so that the gas stream enters the casing in a direction normal to the axis of the drum.

5. A drum filter according to claim 1, wherein said drum is supported at its ends on inwardly directed annular flanges of two angle-section rings attached to the casing.

6. A drum filter according to claim 5, wherein the drum is a stationary drum and is tightly fitted to said angle-section rings.

7. A drum filter according to claim 5, wherein said angle-section rings are provided with annular shoulders on which side margins of the filter cloth can ride.

8. A drum filter according to claim 5, wherein the drum is rotatable about its axis.

9. A drum filter according to claim 8, wherein the drum is mounted for rotation on balls or rollers which ride on said annular flanges.

10. A drum filter according to claim 1, wherein the drum is provided with diametrical stays and is rotatably mounted on at least one axle pin carried by the casing.

11. A drum filter according to claim 10, wherein annular flanges are provided in said casing with which the filter cloth is adapted to make sealing contact.

12. A drum filter according to claim 1, wherein the casing is provided with means whereby it can be connected to the casing of a similar filter or filters.

13. A drum filter according to claim 12, wherein said means comprises at least one flange.

14. A drum filter according to claim 13, wherein fixing holes are provided in said flange.

15. A drum filter according to claim 1, wherein a square section shaft is provided for said driven spool, said square section shaft being capable of being coupled by a push-in socket joint to the corresponding shaft of an adjacent drum filter.

16. A drum filter according to claim 1, comprising at least one fan for increasing the pressure of the gas through the filter.

17. A drum filter according to claim 16, wherein at least one cross flow fan is provided in said exit.

18. A drum filter according to claim 16, wherein the drum is a stationary drum and at least one fan is mounted within the drum.

19. A drum filter for the filtration of a stream of gas, comprising a boxlike casing adapted for connection in horizontal or vertical juxtaposition with other like casings, a drum in said casing, a first spool of filter cloth and a second takeup spool, said drum having closed ends and having a gas-permeable peripheral wall partially enveloped by the filter cloth drawn from the first spool and wound on the second spool, means for driving the second spool, said spools being rotatable about axes parallel to the axis of the drum, a chamber defined by sidewalls and containing said first spool and a second chamber defined by sidewalls and containing said second spool, the said chambers being spaced from one another at one side of said casing and each having at least one hinged access door hingeable about an axis parallel to the axis of the drum, a filter cloth deflecting roller associated with each said chamber adjustable to maintain a filter cloth tightly against said drum and to make sealing contact with a wall of its chamber substantially to close said chamber, a gas exit defined by sidewalls of said spaced chambers, the sidewalls defining the exit diverging outwardly at least at the downstream end of said exit, and a gas entry in that side of the casing opposite said gas exit, and means for passing a gas stream from the entry to the exit through the filter band radially of said drum.

20. A drum filter for the filtration of a stream of gas, comprising a casing consisting of a rectangular section duct, a drum in said duct, a first spool of filter cloth and a second takeup spool, said drum being arranged with its axis normal to the direction of gas flow through said duct, said drum having closed ends and having a gas-permeable peripheral wall partially enveloped by the filter cloth drawn from the first said spool and wound on the second spool, means for driving said second spool, said spools being rotatable about axes parallel to the axis of the drum, a spool chamber defined by sidewalls and containing the first said spool and a second chamber defined by sidewalls and containing second said spool, the said chambers being spaced from one another on the downstream side of said drum and each having a hinged access door hingeable about an axis parallel to the axis of the drum, a filter cloth deflecting roller associated with each said chamber adjustable to maintain a filter cloth tightly against said drum and to make sealing contact with a wall of its chamber, and inlet in the duct and on one side of the drum and a gas exit from said duct and said drum filter, on the opposite side of the drum said gas exit being defined by sidewalls of said spaced chambers.

21. A drum filter for the filtration of a stream of gas, comprising a boxlike casing adapted for connection in horizontal or vertical juxtaposition with other like casings, a drum in said casing, a first spool of filter cloth and a second takeup spool, said drum being closed at one end and having a gas-permeable peripheral wall enveloped by the filter cloth drawn from the first spool and wound on the second spool, means for driving said second spool, said spools being rotatable about axis parallel to the axis of the drum, a chamber defined by sidewalls and containing the first said spool and a second chamber defined by sidewalls and containing the second said spool, the said chambers being in close juxtaposition and each having at least one hinged access door hingeable about an axis parallel to the axis of the drum, a filter cloth deflecting roller associated with each said chamber, said deflecting rollers being in close adjacence and each being adjustable to maintain a filter cloth tightly against said drum and to make sealing contact with a wall of its chamber, a gas entry and a gas exit in opposite walls of said casing adjacent the ends of said drum and means for passing gas from said entry to the exit through the filter band axially of the drum.

22. A drum filter according to claim 21, wherein the filter cloth deflecting rollers are in close adjacence, said drum is closed at one end only, and said entry and exit are so located that the gas stream enters and leaves the casing in the direction of the drum axis.